United States Patent [19]
George et al.

[11] Patent Number: 5,355,083
[45] Date of Patent: Oct. 11, 1994

[54] NON-CONTACT SENSOR AND METHOD USING INDUCTANCE AND LASER DISTANCE MEASUREMENTS FOR MEASURING THE THICKNESS OF A LAYER OF MATERIAL OVERLAYING A SUBSTRATE

[75] Inventors: Alan R. George, San Jose; John A. Dahlquist, Palo Alto, both of Calif.

[73] Assignee: Measurex Corporation, Cupertino, Calif.

[21] Appl. No.: 399,845

[22] Filed: Aug. 29, 1989

Related U.S. Application Data

[63] Continuation-in-part of Ser. No. 272,104, Nov. 16, 1988, abandoned.

[51] Int. Cl.⁵ .................. G01B 7/10; G01B 11/06; G01B 11/14
[52] U.S. Cl. .................. 324/229; 324/226; 324/230; 356/376; 356/381
[58] Field of Search .............. 324/207, 208, 226, 227, 324/229-231; 73/159; 356/375, 376, 381; 250/559, 560, 561; 264/40.2; 118/665, 712; 425/141

[56] References Cited
U.S. PATENT DOCUMENTS

| | | |
|---|---|---|
| 3,243,992 | 9/1963 | Woods . |
| 3,606,541 | 9/1971 | Sugano et al. .......... 356/376 |
| 3,879,614 | 4/1975 | Martin . |
| 3,997,768 | 12/1976 | de Feo . |
| 4,102,578 | 7/1978 | Suzuki et al. .......... 356/376 |
| 4,160,204 | 7/1979 | Holmgren et al. . |
| 4,311,392 | 1/1982 | Yazaki et al. .......... 356/381 X |
| 4,418,574 | 12/1983 | Flournoy .......... 73/601 |
| 4,641,525 | 2/1987 | Merki .......... 73/432.1 |
| 4,814,703 | 3/1989 | Carr et al. .......... 324/207 |
| 5,001,356 | 3/1991 | Ichikawa .......... 324/230 X |

FOREIGN PATENT DOCUMENTS

| | | |
|---|---|---|
| 3435908 | 9/1984 | Fed. Rep. of Germany . |
| 8208862 | 5/1982 | France . |
| 57-506 | 1/1982 | Japan . |

*Primary Examiner*—Gerard R. Strecker
*Attorney, Agent, or Firm*—Spensley Horn Jubas & Lubitz

[57] ABSTRACT

A non-contact thickness measuring sensor is disclosed which determines the thickness of an overlying material on a substrate. The sensor includes two non-contact separation distance measuring devices which may be utilized to measure the distance from the first device to a portion of the interface between the substrate and the overlying material, while the second device determines the distance from the second device to a portion of the surface of the overlying layer. The difference in the measured distances is related to the thickness of the overlying material. In one embodiment, two lasers are used to measure the separation distances. In another embodiment, the two measured distances are coincident. Because of the coincident geometry of these two measurements, the thickness measuring sensor of this embodiment is substantially insensitive to misalignment of the sensor from the normal to the surface of the overlying layer being measured.

8 Claims, 2 Drawing Sheets

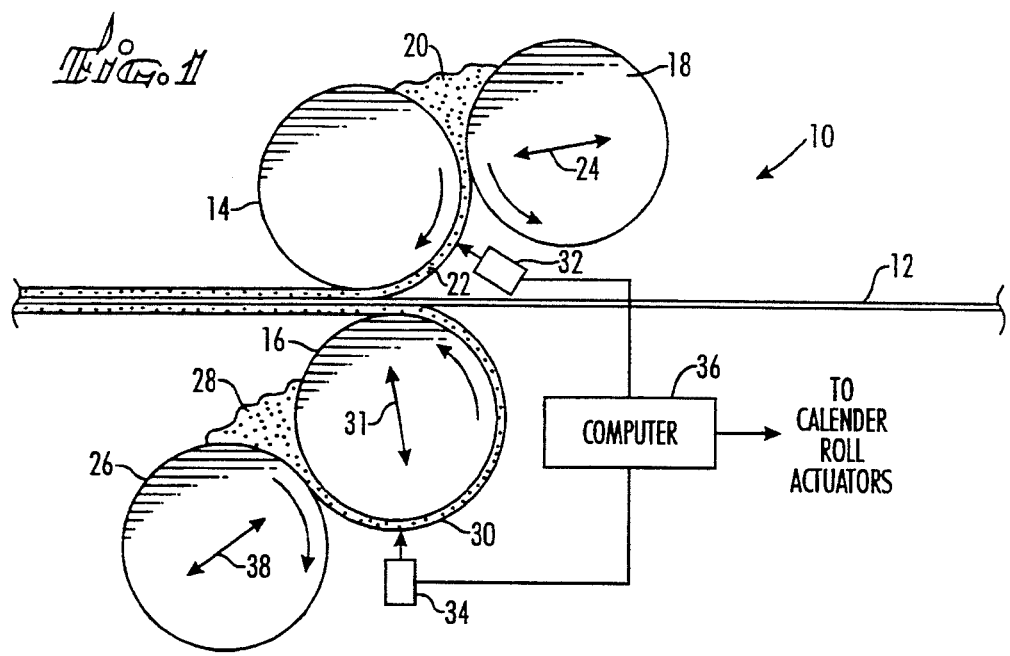
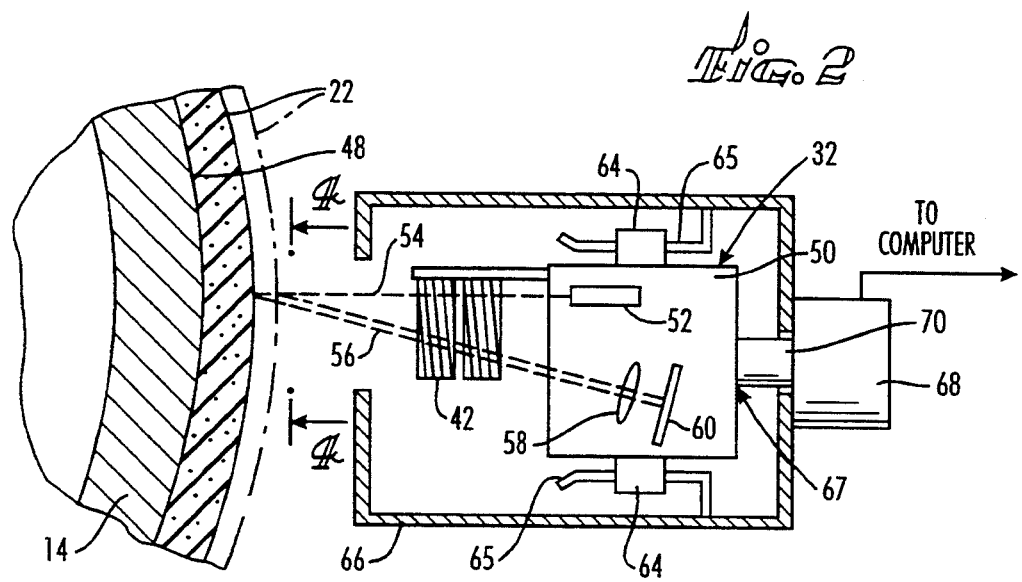
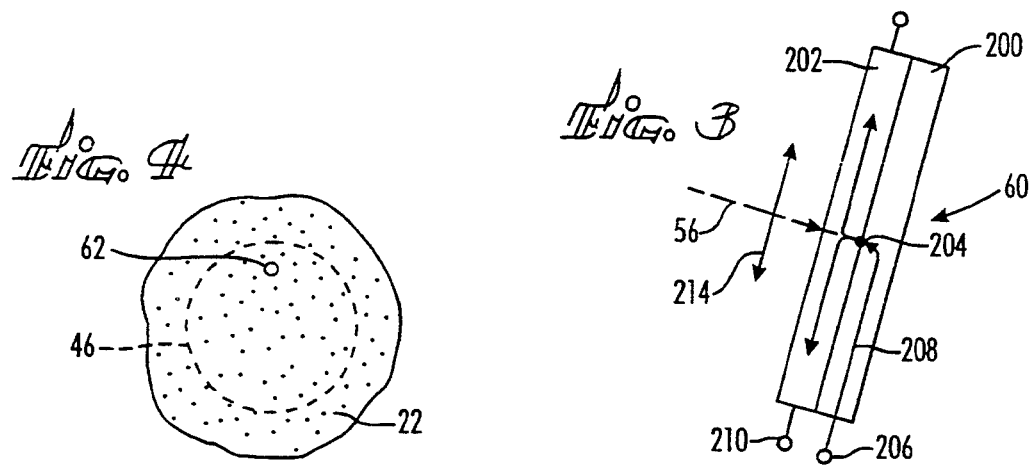

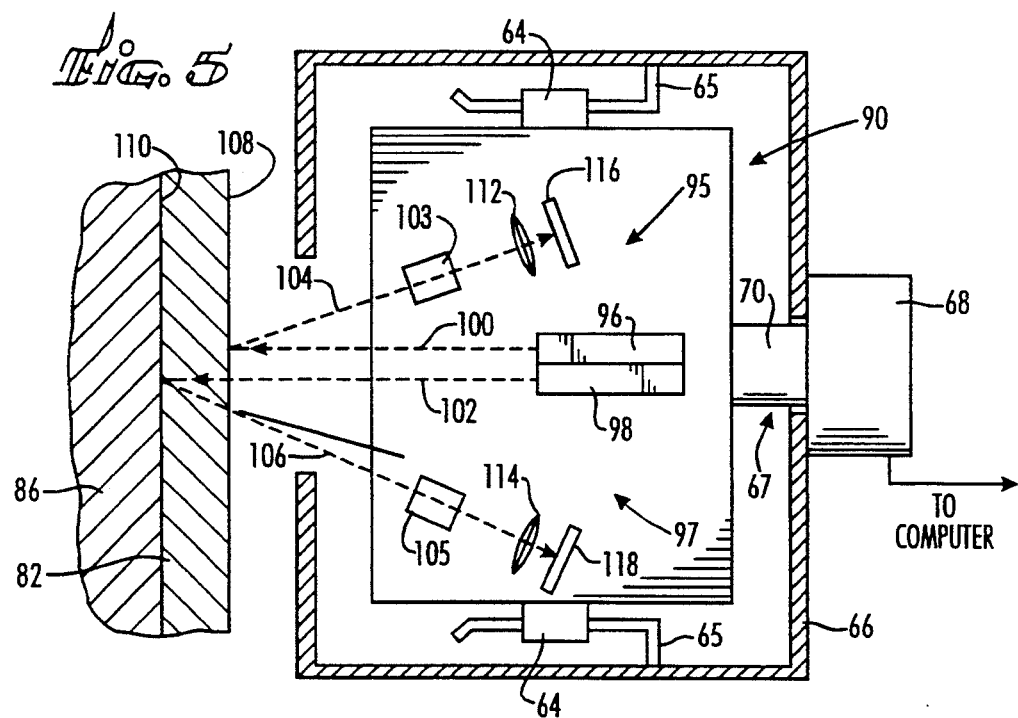
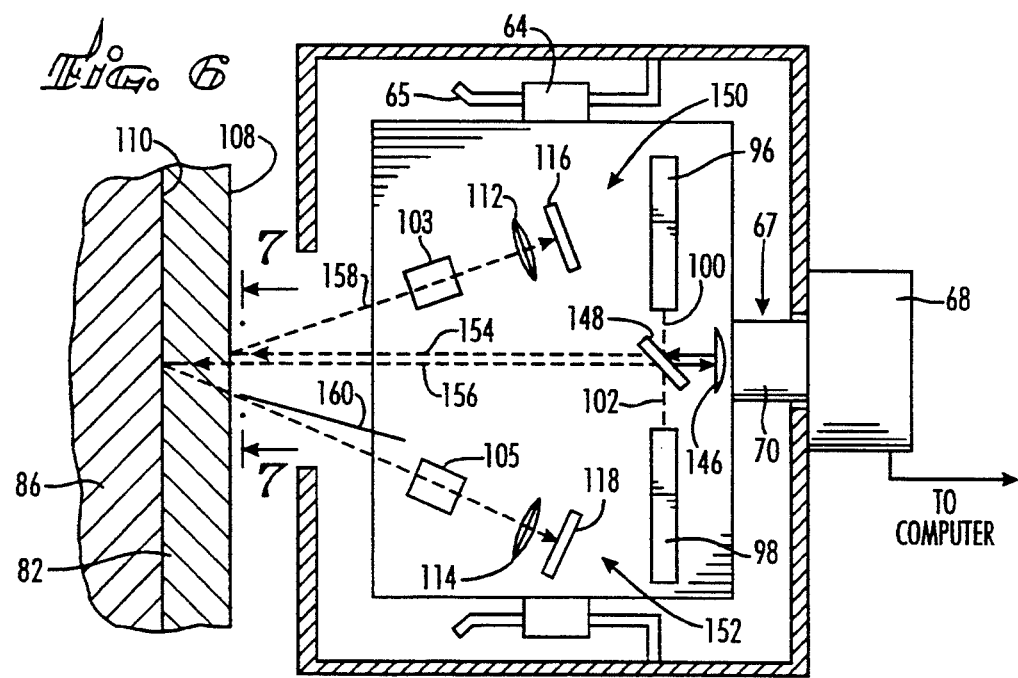
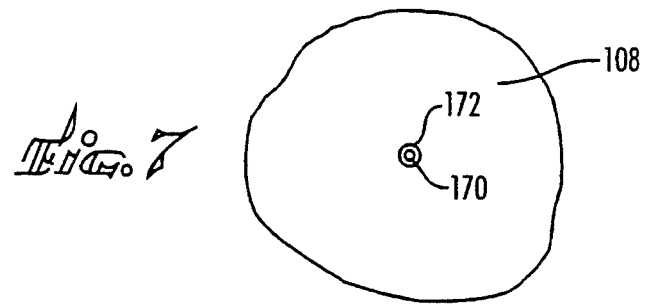

NON-CONTACT SENSOR AND METHOD USING INDUCTANCE AND LASER DISTANCE MEASUREMENTS FOR MEASURING THE THICKNESS OF A LAYER OF MATERIAL OVERLAYING A SUBSTRATE

This is a continuation-in-part of commonly assigned copending U.S. patent application Ser. No. 07/272,104, filed Nov. 16, 1988, now abandoned.

BACKGROUND OF THE INVENTION

The present invention relates to the field of thickness measuring devices, and more particularly to non-contact thickness measuring sensors such as a non-contact sensor for measuring the thickness of a sheet of calendered material.

In many fields of industry and science, it is desirable or necessary to measure the thickness of a dielectric layer or other sheet material overlying a substrate, without physically contacting either the sheet or the substrate.

One such thickness measuring device for use only with an electrically conductive substrate is disclosed in U.S. Pat. No. 3,243,992 to W. W. Woods, which is incorporated herein by reference. In the device disclosed in this patent, a cylinder is disposed perpendicular to a dielectric layer, with the open end of the cylinder spaced by a relatively short distance from the layer surface. The column of air within the cylinder is periodically pressurized with a vibrating loudspeaker-type diaphragm mounted over the end of the cylinder opposite the dielectric surface. The velocity of the pressurized air is measured as the air moves toward the open end of the cylinder. Since this velocity is related to the distance between the surface of the dielectric layer and a reference plane defined by the open end of the cylinder adjacent to the surface of the dielectric layer, the air velocity provides an indication of the separation distance to be gauged.

Woods' device also determines, using a mutual inductance gauge, the separation distance between the reference plane and the interface of the underlying conductive substrate with the dielectric layer. The operation of the mutual inductance gauge is explained in the Woods patent. As disclosed in that patent, the mutual inductance gauge includes a primary coil disposed adjacent to the cylinder on the reference plane defined by the open end of the cylinder, and a secondary coil magnetically linked to the primary coil by a mutual inductance factor which is proportional to the spacing between the primary coil and the substrate/dielectric interface. Consequently, the secondary coil output is indicative of the distance separating the primary coil, or reference plane, from the substrate surface at the interface with the dielectric layer.

As just explained, in the Woods device, the air cylinder gauge measures the distance from the reference plane to the exposed surface of the dielectric layer, while the inductance gauge determines the distance between that same reference plane and the interface between the conductive substrate and the overlying dielectric layer. By determining the difference in distances measured by these two gauges, Woods' thickness measuring device can determine the thickness of the dielectric layer. However, according to Woods' disclosure, the air cylinder gauge and the inductance gauge are disposed adjacent to each other along the surface of the layer whose thickness is to be measured. As a result, the accuracy of the overall device requires that both the air cylinder gauge and inductive gauge measure the respective distances from the same reference plane. Unfortunately, however, in many practical situations, it may be extremely difficult, if not impossible, to precisely align the inductance gauge with the reference plane of the air cylinder gauge. Alternatively, the substrate may have some intended or inadvertant curvature. Since the air cylinder and inductance gauges do not measure the respective distances at the same location, such misalignment or substrate curvature may lead to substantial error in the thickness measurement.

Moreover, the thickness measuring device may be subject to vibrations such that, at any instant during its operation, the air cylinder may be relatively closer or further away from the surface under test than the inductive gauge. As a result, error will be induced in the resulting measured thickness, since, as previously mentioned, the operation of the device assumes that both the inductance gauge and air cylinder gauge sides of the device are exactly disposed along the same reference plane, and that the substrate remains parallel to the reference plane.

Also, because one of the distance measuring gauges utilizes an electromagnetic coil to determine the distance from the reference plane to the substrate, Woods' apparatus is limited to use with electrically conductive substrates. Accordingly, such a thickness measuring device may not be completely satisfactory under many circumstances where the substrate is nonconductive.

SUMMARY OF THE INVENTION

The present invention concerns a sensor for measuring the thickness of a first material or coating layer overlying a second material or substrate.

According to one variation of the invention, an inductive displacement device includes at least one magnetic coil disposed adjacent to and spaced from the exposed surface of the overlying material, such that the axis of the coil is substantially perpendicular to the exposed surface of the overlying material. The coil is operatively connected to a circuit which produces an output indicative of the separation distance between the coil and the interface between the overlying material and the substrate. The coil is formed such that the center of the coil or "core" is transparent. This may be accomplished simply by making the core hollow.

A laser triangulation device, of a type known in the art, including a laser and photosensitive detector, is disposed adjacent to the coil on the side of the coil opposite the surface of the overlying material. The laser is positioned to direct a laser beam through the coil core to the exposed surface of the overlying material. The laser beam is reflected by the exposed surface. The reflected light is imaged onto the photosensitive detector and the position of the image on a photosensitive detector is determined. Since the point on the photosensitive detector illuminated by the reflected image is a function of the distance between the photosensitive detector and the exposed surface of the overlying material, the output of the laser triangulation device can be used to determine the position of the exposed surface through triangulation techniques.

From the above, it will be understood that the difference between the laser triangulation measurement and inductive measurement, relative to a common reference plane, determines the measured coating thickness. It will be further understood from the above that the laser triangulation measurement determines the separation distance between the laser device and a portion of the overlying material which is directly over a portion of the substrate with respect to which the inductive displacement device renders its separation measurement. In other words, the laser and inductive measurements are coincident. Accordingly, in many practical situations, the accuracy of the thickness measuring sensor of the present invention will be greatly improved over that of other thickness measuring devices. That is, because the laser and inductive measurements are coincident, unlike with the Woods device, such measurements are relatively insensitive to any lack of perpendicularity between the laser beam or coil axis and the measured surfaces.

Alternatively, two laser triangulation devices can be used in place of the laser/inductive coil configuration. The two lasers are chosen to generate beams having different wavelengths. One of the lasers is selected so that its projected beam will reflect off of the exposed outer surface of the overlying material. The beam generated by the second laser will be of such wavelength as to transmit through the overlying material and reflect off of the substrate.

The reflected light from the two beams is imaged onto separate photosensitive detectors, and the positions of the images along the detectors are determined. Since the points on the photosensitive detectors illuminated by the reflected images are a function of the distances between the respective laser triangulation devices and the surfaces of the overlying material and substrate, the output of the laser triangulation devices can be used to determine the distances from the laser triangulation devices to the respective reflective surfaces. Sensor calibration compensates for any refraction of the reflected beam from the second laser occurring as that beam exits the overlying material. From the above, it will be understood that the difference between the two laser triangulation measurements determines the measured material thickness.

The use of two lasers in place of the previously described laser/inductive coil system has advantages in certain situations. For example, electrically conductive substrates and dielectric overlying layers are not required with the two laser embodiment. As a result, the two laser embodiment of the present invention can be used in a wide variety of situations where a magnetic coil distance measuring device would not function. As a specific example, with the selection of appropriate wavelengths, the two laser embodiment can be used to measure the thickness of one layer of a co-extruded multilayer plastic sheet.

BRIEF DESCRIPTION OF THE DRAWINGS

FIG. 1 is a cross-sectional illustration of an application of the present invention in a rubber calendering operation.

FIG. 2 is a cross-sectional illustration of a preferred embodiment of a sheet thickness sensor according to the present invention incorporating an inductive coil and a laser triangulation device slidably mounted within a housing, and an actuator for precisely controlling in a stepwise manner the distance between a rubber covered steel calender roll and the thickness measuring sensor.

FIG. 3 is a schematic representation of the photosensitive position detector of the laser triangulation device.

FIG. 4 illustrates a view of the calendered sheet taken along line 3—3 of FIG. 2 showing the small spot of the calendered sheet illuminated by the laser and the radio frequency ("R.F.") magnetic field pattern generated by the coil of the sheet thickness measuring sensor.

FIG. 5 is a simplified cross-sectional illustration of one embodiment of a sheet thickness measuring sensor according to the present invention incorporating two laser triangulation devices mounted side-by-side within a housing and an actuator for precisely controlling in a stepwise manner the distance between the overlayer and substrate, and the thickness measuring sensor.

FIG. 6 is a simplified cross-sectional illustration of another embodiment of the thickness measuring sensor according to the present invention wherein two laser beams are directed coincidentally toward the surface of the sheet to be measured. An actuator precisely controls in a stepwise manner the distance between the overlayer and substrate, and the thickness measuring sensor.

FIG. 7 illustrates a view facing the calendered sheet taken along line 7—7 of FIG. 6 indicating a small spot on the sheet illuminated by the two coincident laser beams.

DETAILED DESCRIPTION OF THE DRAWINGS

FIG. 1 is a simplified cross-sectional schematic view of a tire fabric calendering device 10. In operation, steel or fabric cords 12 are passed through a calender including the rolls 14 and 16. Rolls 14 and 18 act together to convert rubber, sometimes called gum, from the bulk form 20 into a sheet 22 having a carefully controlled thickness. The thickness of this sheet 22 is controlled by actuators (not shown) which move roll 18 toward or away from roll 14 along the line defined by arrows 24. Rolls 16 and 26 likewise work together to convert bulk rubber 28 into a second sheet 30. The thickness of this second sheet 30 is similarly controlled by actuators (not shown) which move roll 26 toward or away from roll 16 along a line defined by arrows 38. Calender rolls 14 and 16 operate to apply sheets 22 and 30 to opposite sides of the steel or fabric cords 12. Roll 16 is similarly moved by actuators (not shown) along the line defined by arrows 31 toward or away from roll 14, to thereby control the pressure squeezing sheets 22 and 30 together.

In the manufacture of tire fabric, the thickness of the rubber sheets applied to each side of the cords is an important parameter which is desirably measured and, based upon the sheet thickness measurements, controlled.

In the embodiment illustrated in FIG. 1, sheet thickness sensors 32 and 34 are disposed near one end of calender rolls 14 and 16, respectively. Signals from sheet thickness sensor 32 are used to measure the thickness of sheet 22 calendered between rolls 14 and 18, while sheet thickness sensor 34 measures the thickness of the sheet 30 which is calendered between rolls 16 and 26. Each of these sheet thickness sensors provides signals to the computer 36, which in turn determines the thickness of sheets 22 and 30, respectively, at the ends of the rolls being monitored by each sheet thickness sensor. If the thickness of either sheet is greater or less than the desired thickness, then the roll position actuators are energized to alter the size of the nip between rolls 14 and 18 or between rolls 16 and 26.

Additional sheet thickness sensors (not shown) may be disposed near the opposite ends of the calender rolls, 14 and 16, from sensors 32 and 34. The thickness measurements provided by such additional sensors can likewise be transmitted to the computer 36 and used to ensure that the calendered sheets, 22 and 30, have substantially the same thickness across their entire widths. If, for example, the sheet thickness sensors determine that sheet 22 has a greater thickness than desired on only one side of the sheet, then the actuator on the corresponding side of roll 18 can be energized to move only that side of roll 18 closer to roll 14, so that sheet 22 has a substantially uniform thickness across its width.

FIG. 2 is a more detailed cross-sectional illustration of sheet thickness sensor 32 which may be used in the tire fabric calendering system 10 of FIG. 1. The sensor 32 utilizes an R.F. inductive displacement device having a magnetic coil 42 which is energized by an alternating R.F. current. The current through the coil 42 generates a magnetic field, which, in turn, induces eddy currents in the electrically conductive steel calender roll 14. These currents are induced in a roughly circular area of the steel roll, as indicated by the dashed circle 46 in FIG. 4.

The inductance of coil 42 will change with the proximity of the roll 14 to the coil 42. A circuit associated with the inductive displacement device is utilized to sense the changes in inductance of coil 42 and provide an output signal indicative of the separation distance between the coil 42 and the interface 48 of the calendered rubber sheet 22 and roll 14.

FIG. 2 also illustrates a laser triangulation device 50 which forms part of the sensor 32. A laser 52 is disposed to project an incident laser beam 54 through the hollow core of the coil 42 and toward the exposed outer surface of the calendered rubber sheet 22. Diffuse reflections 56 from the surface of the rubber sheet 22 travel back through the hollow coil 42 and are focused by a lens 58 onto a photosensitive detector 60. The image of the laser light spot on the photosensitive detector 60 will move across the detector surface (as shown by the dashed lines 56) with the movement of the surface of the sheet 22 toward and away from the sensor 32. The position of the image on the detector 60 can be determined, and therefore, the output signal from the laser triangulation device 50 can be used to locate the position of the surface of the sheet 22 relative to the triangulation device.

As illustrated in FIG. 3, in one embodiment of the triangulation device, the photosensitive detector 60 includes an elongated linear reverse biased photosensitive diode. One layer 202 of the diode is exposed to the reflected beam of laser light 56 to produce a short circuit 204 between the two layers 200, 202 of the diode at the illuminated spot. A voltage is applied (at 206) to the underlying layer 200 and the current 208 flowing through the short circuit 204 to the exposed surface layer 202 is measured at each end 210, 212 of the diode 60. As the reflected beam 56 moves along the length of the diode 60 (as shown by arrows 214) with changes in position of the reflecting surface, the proportion of current 208 flowing to opposite ends of the diode 60 will vary. Therefore, the current measured at each end 210, 212 of the diode 60 can be used to determine the position of the beam 56 along the diode 60, and hence the location of the reflecting surface.

FIG. 4 illustrates the surface of the calendered sheet 22 viewed from line 4—4 in FIG. 2. In this figure, the dashed circle 46 indicates the area of the steel calender roll wherein the magnetic field of the coil 42 induces eddy currents in the steel roll 14. The small circle 62 within circle 46 indicates the area of the sheet surface illuminated by the laser beam 54. As shown in FIG. 4, the laser beam illuminated spot is coincident with the area of the roll 14 affected by the coil 42. Because of this geometry, the sensor 32 of the present invention is relatively insensitive to any misalignments which would cause the laser beam 54 or axis of the coil 42 to move from the normal to the sheet surface. If the laser triangulation device 50 and coil 42 were positioned side-by-side, any tilting or misalignment of the sensor would place the coil 42 closer or further away from the calender roll 12, relative to the laser device 50, than intended. In such a configuration, as the laser device 50 is moved nearer to or farther away from the sheet surface, substantial errors can be induced in the thickness measurement, since this measurement results from a difference in the distance measurements of the laser device and inductance device. However, with the present invention, as shown in FIG. 4, the laser device 50 and inductance device measure the distance to coincident areas of the roll 14 and sheet 22, although the magnetic eddy currents spread out to a greater lateral extent than the laser beam 54. Nevertheless, because the areas sensed by the laser device 50 and inductive coil 42 are coincident, the present thickness sensor is substantially less subject to error caused by misalignment of the sensor relative to the sheet whose thickness is being measured. In fact, in an embodiment of the invention wherein the laser beam and magnetic field patterns are concentric, any error in thickness measurement caused by tilting the sensor from the normal to the sheet surface will be minimized.

As best illustrated in FIG. 2, in this invention the laser device 50 and inductive coil 42 are rigidly mounted to a movable carriage 64 within the sensor housing 66. A linear actuator 67, such as a stepper motor 68 and lead screw 70 (or other actuator for precisely moving the laser device 50 and inductive coil 42 in discrete linear steps toward and away from the roll 14) are used to move the carriage 64 along guide rails 65 by precisely known increments relative to the housing 66. This provides 3 key functions: (1) automatic computer controlled calibration; (2) automatic computer controlled standardization; and (3) computer controlled change of sensor standoff distance to accomodate target motion and optimize the operating point of the sensor 32 for better precision measurement.

The automatic calibration function is provided using the linear actuator 67 to position the sensor 32 at a plurality, for example 20, precisely known increments of distance from an arbitrary zero point. Both the laser and inductance distance measurements may be taken at each of the 20 positions. Standard, mathmatical regression techniques are then used to fit a nonlinear calibration curve to the data points from each of the 20 positions. Based upon this mathematical analysis, calibration constants for the system are determined which relate the sensor outputs to known distances. Ordinarily, this procedure is carried out while the sensor is "looking" at a fixed target, such as a bare calender roll.

For a product whose thickness varies over a wide range of thicknesses, it may not be possible to provide the necessary accuracy using a single calibration curve. However, use of the linear actuator 67 permits separately calibrated ranges of measurement. In this instance, a first regression can be performed to determine a first calibration curve for data points taken from the sensor 32 at each of a first set of 10 adjacent distance increments nearest to the roll 14. A second regression analysis is performed to obtain a second calibration curve for data received from the laser and inductance devices while positioned at the second set of 10 distance increments. The separate calibration curves can then be utilized to determine measured separation distances from the sensor outputs in each of the two separate ranges.

For thick sheets, it may be necessary to calibrate the inductive separation distance measuring device separately from the laser portion of the sensor simply because the laser device may not be operable at the separation distances which must be measured by the inductance device. In this situation, the linear actuator can step the sensor through a first series of precisely known separation distance increments which are near the target and within the range of measurement of the laser device. Data points are collected at each increment and a calibration curve determined for the laser device by the previously mentioned regression technique. Then, the linear actuator can be made to move the sensor back from the target by a precisely known distance to a separation distance which is within the range of separation that must be measured by the inductance device. At this point, the linear actuator will step the sensor through a second series of precisely known separation distance increments, and the resulting data is used to determine a calibration curve for the inductance sensor.

From the above, it is clear that this aspect of the invention permits separately calibrating non-overlapping ranges of measurement for the laser and inductance devices. This is particularly useful when the measured sheet product is so thick that the separation distance which must be measured by the inductive device is out of the range of measurement of the laser device. Of course, the stepping of the linear actuator through each series of distance increments is preferably conducted under computer control, and the collection of data and mathematical regression calculations are also preferably conducted by the computer.

To eliminate absolute accuracy degradation due to sensor drift during operation, the sensor 32 can be periodically "standardized" by stepping the sensor to just a few, e.g., 2 or 3, of the positions used during the calibration procedure. The distance measurements at these positions can be compared to the original calibration curves. Slight corrections can then be made to the constants defining the calibration curves, as necessary. This is faster and easier than a full recalibration, and can be performed periodically and automatically by the computer 36 controlling the sensors 32 and 34.

In certain situations, such as a change in the grade of tire fabric being manufactured, the thickness of the rubber sheet may be changed to such an extent that the rubber and steel roll surfaces may be moved outside of the useful range of measurement of one or both of the laser or inductance devices. In the past, when a target material has been moved out of range of a sensor, the sensor has had to be manually repositioned on the sensor mounting. However, with the present invention, the linear actuator can be used to adjust the standoff distance (i.e., the nominal distance between the roll 14 and the sensor 32) so that both the rubber and steel surfaces are comfortably within range of the laser and inductive devices. This avoids the need to manually reposition the sensor housing 66 on its mounting (not shown). Moreover, lower drift and/or superior accuracy are frequently obtained within some subrange of the useful measurement range. In this case, the standoff distance can be automatically changed to take advantage of such lower drift and/or superior accuracy.

Another embodiment of the present invention consists of two laser triangulation devices, where one laser triangulation device takes the place of the previously described inductance sensor. This dual laser configuration allows measurement of the thickness of an overlying layer, without requiring an electrically conductive underlying substrate. However, the overlying layer to be measured must necessarily be transparent to the laser light generated by one of the two lasers.

FIG. 5 is a cross-sectional illustration of thickness sensor 90. The sensor 90 utilizes two laser triangulation devices 95 and 97. The lasers are disposed to project separate laser beams 100 and 102 toward the exposed outer surface 108 of the overlying layer 82. Diffuse reflections 104 and 106 from the surfaces of the overlying layer 108 and substrate 110, respectively, are focused by two lenses 112 and 114 onto photosensitive detectors 116 and 118. As previously discussed, the positions of the focused images on the detectors 116 and 118 can be determined. The output signals from the laser triangulation devices 95, 97 are then fed to a computer (FIG. 1) and used to locate the positions of the surfaces of the overlying sheet 108 and underlying substrate 110 relative to the triangulation devices, 95 and 97.

The two lasers 96 and 98 are selected to generate beams of different wavelengths. One laser beam, 100, directed toward overlying material 82 will diffusely reflect off surface 108. The reflected laser light is focused by lens 112 onto photosensitive detector 116. The laser beam 100 will have a wavelength such that it will reflect off of surface 108 with little absorption into the overlying material 82. Similarly, laser beam 102 is directed toward the overlying material, but the wavelength of beam 102 is chosen so that it will be transmitted through the material 82 and reflect off the surface 110 of the underlying substrate 86. Any refraction of the reflected beam 106 at the surface 108 of the overlying sheet 82 will be compensated for by the previously discussed triangulation calibration procedure.

In one mode of operation, both lasers 96, 98 are operated continuously. Thus, the two laser beams 100, 102 will continuously reflect off of the overlying surface and underlying substrate. It is, therefore, necessary to ensure that the photosensitive detectors 116, 118 can distinguish between the light originating from the two lasers 96, 98, respectively. To accomplish this, optical band-pass filters 103 and 105 may be disposed such that the diffusely reflected light will be filtered before reaching the lenses and photodetectors. The two filters 103, 105 are chosen to transmit light only over specific spectral ranges. The spectral range of one filter must be such that it only transmits light from one of the laser beams. For example, the spectral range of filter 103 will correspond to the wavelength of laser 96, thereby allowing only the diffuse reflection 104 of beam 100 to be transmitted through the filter 103. Similarly, the passband of filter 105 is selected to correspond to the wavelength of incident beam 102.

Alternatively, the lasers 96, 98 may be fired sequentially in an alternating fashion. The associated computer can then be programmed to alternately determine distances to the exposed surface 108 and substrate surface 110 synchronously with the firing of each laser 96, 98. The pulsed laser beams remove the necessity of band-pass filters, since only one beam can be detected during a single period and there will be no commingling of reflections.

In yet a third mode of operation, the lasers 96, 98 can be pulsed at different frequencies and the output of each detector 116, 118 synchronously gated to the computer at the pulse frequency of the corresponding laser. This mode of detection is called synchronous detection and, because it is well known in the art, will not be further discussed herein.

Another embodiment of the present invention using two lasers is shown in FIG. 6. The two lasers 96 and 98 are positioned to project two laser beams 100 and 102 toward each other. At a point between the two lasers, the beams contact a beam splitter, made from a half-silvered mirror 148, and a fully-silvered mirror 146. At this junction, the two laser beams 100, 102 will be directed coincidently toward the overlying material 82. The embodiment of FIG. 6 generally allows greater measurement accuracy than the embodiment in FIG. 5 due to the coincident nature of the two beams 154 and 156. Although shown side-by-side in FIG. 6 for the purpose of illustration, the two laser beams 154, 156 are preferably coaxial and have the same diameter. These two laser beams 154, 156 will follow the same path to the overlying material 82. Beam 154, with a different wavelength than that of beam 156, reflects off of the outer surface 108 and the diffuse reflection 158 is focused at lens 112 and detected by the photosensitive detector 116. Similarly, laser beam 156 is transmitted through the overlying material 82 and is reflected off of surface 110 of the underlying substrate 86. The diffuse reflection 160 is focused at lens 114 and detected by the photosensitive detector 118. Again, calibration techniques are used to compensate for the effects of refraction. Also, as in FIG. 5, filters 103 and 105 are selected so that their passbands correspond, respectively, to the wavelengths of beams 158 and 160.

FIG. 7 illustrates the surface 108 of the overlying material 82 viewed from line 7—7. The small circle 170 within another circle 172 indicate the sheet surface illuminated by the laser beams 154 and 156. The difference in the diameter of the two circles 170, 172 is for illustrative purposes only. The cross-sectional area of beam 154 may be greater, smaller or equal to that of beam 156, as desired. As shown in FIG. 7, the laser beam illuminated spots are coincident with each other. For the reasons previously discussed, this geometry has the advantage of being substantially insensitive to misalignment which would cause the laser beams 154 or 156 to move from the normal to the sheet surface.

In the embodiments illustrated in FIGS. 5–6, the laser triangulation devices are rigidly mounted to a movable carriage 64 within the respective sensor housings. As described in detail in connection with the embodiment of FIG. 2, a computer controlled linear actuator 67 is operative to precisely move the laser devices in discrete linear steps toward and away from the target surfaces. As explained in connection with FIG. 2, this provides three key functions: (1) automatic computer controlled calibration; (2) automatic computer controlled standardization; and (3) computer controlled change of sensor standoff distance to accommodate target motion and optimize the operating point of the sensor for better precision measurement.

The dual laser embodiments of the present invention may include a helium-neon (HeNe) gas laser and a gallium aluminum arsenide (GaAlAs) semiconductor laser. The HeNe laser projects a beam having a wavelength of 632.8 nm. The wavelength of the GaAlAs laser beam ranges between 780–820 nm. These two types of lasers may be used, for example, to measure the thickness of a polypropylene sheet on an aluminum backing. Polypropylene reflects the HeNe laser light at 632.8 nm, but is transparent to light between 780–820 nm. The 780–820 nm GaAlAs beam, however, reflects off of the underlying aluminum surface. The filter associated with the HeNe laser triangulation device transmits only the reflected HeNe laser light having a wavelength equal to 632.8 nm, thereby filtering out the GaAlAs laser beam reflection. Conversely, the filter associated with the GaAlAs laser triangulation device transmits the reflected GaAlAs laser light with wavelengths between 780–820 nm, but filters out the 632.8 nm HeNe laser light. The lenses then focus the diffuse, filtered reflections onto the respective photosensitive detectors. Ultimately, as previously discussed, the outputs of the two laser triangulation devices are used to calculate the thickness of the polypropylene sheet.

Three embodiments of the present invention have been described. Nevertheless, it is understood that one may make various modifications without departing from the spirit and scope of the invention. For example, one may take advantage of the superior insensitivity to misalignment of certain embodiments of the present invention which utilize coincident measurements using distance measurement sensors other than the laser and inductance devices or the dual laser devices disclosed. Also, the present invention may be utilized in the thickness measurement of many types of materials on many types of backing materials other than those specfically discussed therein. Devices for controlling the thickness of layers of material other than the disclosed tire fabric calendering devices are usable with the present invention. For example, the present invention may be used in connection with the control of a die which is controllable to vary the thickness of an extruded plastic material, or a device for controlling the thickness of a coating applied to many different types of substrates. Thus, the invention is not limited to the described embodiments, but may be altered in a variety of ways which will be apparent to persons skilled in the art.

We claim:

1. A thickness measuring sensor for measuring the thickness of a solid material overlying an electrically conductive material without contacting the solid material, comprising:

an inductive separation distance measuring device, including a coil, for measuring a first distance between a portion of the conductive material/overlying material interface and a first reference location spaced from the overlying material; and a laser separation distance measuring device, including a laser disposed to direct a laser beam through the coil, for measuring a second distance between a portion of the exposed surface of the overlying material and a second reference location spaced from the overlying material.

2. The sensor of claim 1, wherein the inductive separation distance measuring device includes a first electric circuit operatively coupled to the coil for producing a first signal indicative of the first distance between the coil and the conductive material, and wherein the laser separation distance measuring device includes a second electric circuit for producing a second signal indicative of the second distance between the exposed surface of the material overlying the conductive material and the laser device, the sensor further comprising a computer operatively coupled to the first and second circuits for determining the thickness of the overlying material based upon the first and second signals.

3. The thickness measuring sensor of claim 1, wherein the laser projects an image within a magnetic field pattern generated by the inductive separation distance measuring device.

4. The thickness measuring sensor of claim 1, wherein the laser image and the magnetic pattern are projected along a common axis substantially normal to the sheet so that any error in the thickness measurement caused by tilting the common axis from normal to the surface is minimized.

5. The thickness measuring sensor of claim 3, wherein the laser image and the magnetic pattern are concentric with respect to each other.

6. A system for controlling the thickness of a sheet of material adjacent to a substrate, comprising:

means for producing a sheet of variable thickness;

an inductance separation distance measuring device including a coil for sensing a first separation distance between a portion of the substrate/sheet interface and a first reference location and for generating a first signal indicative of the sensed first distance;

a laser separation distance measuring device, spaced from the sheet, disposed to direct a laser beam through the coil, for sensing the second separation distance between a portion of the sheet surface opposite the substrate and a second reference location and being operable to generate a second signal indicative of the sensed second distance, wherein the laser separation distance measuring device emits a beam along an optical axis which is substantially normal to the portion of the sheet surface, the inductance separation distance measuring device and the laser separation distance measuring device being disposed such that the portion of the sheet surface opposite the substrate overlies the portion of the substrate/sheet interface and the inductance separation distance measuring device and the laser separation distance measuring device being spaced from the sheet and the substrate; and a controller, operatively, coupled to the inductance separation distance measuring device and the laser separation distance measuring device, wherein the controller is operable to control the sheet producing means based upon the first and second signals such that the sheet producing means produces a sheet having a desired thickness.

7. A method for measuring the thickness of a material overlying a substrate, comprising the steps of:

measuring a first distance between a portion of the substrate/overlying material interface and a first reference location with a non-contact distance measuring device, including an inductive coil;

measuring a second distance between a portion of the surface of the overlying material opposite the substrate and a second reference location with a laser triangulation device including a laser disposed to direct a laser beam through the coil, wherein the first and second distance measurements are coincident even when sensor tilting or misalignment occurs; and calculating the difference between the measured distances and determining the thickness of the overlying material based upon the calculated difference.

8. A non-contact sensor for measuring the thickness of a material overlying a substrate, comprising:

an inductive separation distance measuring device for measuring a separation distance between a portion of the substrate/overlying material interface and a first reference location; and a laser separation distance measuring device, spaced from the material, for measuring a separation distance between a portion of the surface of the overlying sheet of material and a second reference location, the inductive separation distance measuring device and the laser separation distance measuring device transmitting along a common axis and being disposed such that the portion of the surface the overlying material overlies the portion of the substrate/overlying material interface.

* * * * *